US006270610B1

(12) United States Patent
Benoit et al.

(10) Patent No.: US 6,270,610 B1
(45) Date of Patent: Aug. 7, 2001

(54) METHOD FOR PREPARING MULTILAYER FILM STRUCTURES FOR USE IN THE PRODUCTION OF BANKNOTES OR THE LIKE

(75) Inventors: Gordon L. Benoit, Victor; Rudolph VanderVelden, Macedon, both of NY (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 08/467,484

(22) Filed: Jun. 6, 1995

Related U.S. Application Data

(62) Division of application No. 08/266,918, filed on Jun. 27, 1994, now Pat. No. 5,698,333.

(51) Int. Cl.$^7$ ..................................................... B31F 1/00
(52) U.S. Cl. ......................... 156/220; 156/182; 156/277; 156/315; 283/57; 283/107; 283/902; 428/114
(58) Field of Search .................................. 156/220, 277, 156/315, 182; 428/114; 283/57, 107, 902

(56) References Cited

U.S. PATENT DOCUMENTS

| | | | |
|---|---|---|---|
| 2,330,718 | * 9/1943 | Kallmann | 156/277 |
| 3,484,336 | * 12/1969 | Aulik et al. | 156/315 |
| 3,619,339 | * 11/1971 | Garrett | 156/296 |
| 3,811,979 | * 5/1974 | Dempsey et al. | 156/209 |
| 4,186,943 | * 2/1980 | Lee | 283/107 |
| 4,247,318 | * 1/1981 | Lee et al. | 156/308.2 |
| 4,536,016 | * 8/1985 | Solomon et al. | 40/405 |

* cited by examiner

Primary Examiner—John J. Gallagher
(74) Attorney, Agent, or Firm—T. Dean Simmons

(57) ABSTRACT

A laminated multilayer film substrate for use in the production of banknotes includes a first layer comprising (a) a first layer having inner and outer sides, comprising at least about 50 weight percent of a high density polyethylene having a density of at least about 0.94, said first layer being oriented in the transverse direction (TD) to a degree which is at least three times greater than the degree of orientation present in the machine direction (MD);

(b) a second layer having inner and outer sides, comprising at least about 50 weight percent of a high density polyethylene having a density of at least about 0.94, said second layer oriented in the transverse direction to a degree which is at least three times greater than the degree of orientation present in the machine direction; and (c) a laminating adhesive resin disposed between the inner sides of (a) and (b), which comprises a component selected from the group consisting of low density polyethylene (LDPE) and linear low density polyethylene (LLDPE); said second layer being laminated to said first layer so that the transverse direction of orientation of said second layer is substantially aligned with the transverse direction of orientation of said first layer. The resultant films exhibit good embossability, dead-fold characteristics and other properties, making them highly suited for the production of bank notes and other security documents.

9 Claims, No Drawings

METHOD FOR PREPARING MULTILAYER FILM STRUCTURES FOR USE IN THE PRODUCTION OF BANKNOTES OR THE LIKE

This is a division of application Ser. No. 08/266,918 filed on Jun. 27, 1994, now U.S. Pat. No. 5,698,333.

FIELD OF THE INVENTION

The present invention relates to a multilayer film for use in the production of paper-like products such as bank notes, security documents, including travellers and bank checks, and to a method for their production. More particularly, the present invention relates to a multilayer film having the characteristics of the high quality papers typically employed in the production of bank notes and security documents.

BACKGROUND OF THE INVENTION

In the production of bank notes, security documents and the like, rag paper has been employed for over 300 years. As is well known, rag paper has several properties which are highly desirable in such applications, including dead foldability, tear resistance, printablilty and embossability.

These highly desired properties may be characterized as follows: deadfold is the ability of a substrate to be creased or folded and to retain the fold without opening. Tear resistance is the ability of a substrate to resist both initiated and uninitiated tears and punctures. Printability is the ability of the substrate to adsorb and bond inks used during the lithographic printing process. Embossability is the ability of the substrate to deform under the pressures of the intaglio printing process to form a raised image on the resulting bank note or security document, with the intaglio ink remaining on the raised, deformed region resulting in a high degree of tactility or feel to the bank note or security document. As may be appreciated, these properties combine to give bank notes and the like their familiar feel and functionality.

With the advent of color copiers and computer graphic scanners, the counterfeiting of bank notes has markedly increased. While there are active programs underway by major currency paper producers to make their substrate more secure through the use of watermarks, metallized threads and optical variable devices (OVD's), such as photochromics, holographics, and diffraction gratings, at this time, these efforts do not appear to hold much promise of thwarting counterfeiters.

Plastic substrates offer a major security feature if a clear "window" is incorporated into the bank note. This window would ensure that a scanner or color copier could not copy the note. Additionally, other security features can be incorporated into or onto the bank note, including reverse printing of the note to protect the security devices and the print.

Australian Pat. No. 488,652, discloses an approach to the production of security articles, particularly bank notes, and describes the serious problems which confront conventional bank notes with respect to forgery. The bank note disclosed therein comprises a substrate of opaque thermoplastic sheet material intimately bonded to a web of woven or unwoven thermoplastic fibers, the substrate being printed as desired and having bonded thereon one or more optically-variable security devices. The fibrous web was employed to impart durability, crumple-resistance and tear-strength to the note. Where a security device, such as a Moire pattern, was employed which depended for its optically variable properties upon the transmission of light, it was necessary to punch out a hole in the substrate, insert the device and bond it in place with further layers of transparent plastic sheet material.

Although samples of bank notes formed according to the disclosure of Australian Patent No. 488,652 were said to have performed most satisfactorily with respect to the durability and security of conventional notes, they were found to be rather complex in construction and relatively expensive to produce. Moreover, when transmission security devices were inserted in pockets in the substrate, an area of weakness and high stress was created which reduced both durability and security.

Other disclosures relating to anti-counterfeiting techniques include U.S. Pat. Nos. 4,095,217 and 4,281,208, which relate to the use of a liquid crystal device driven by a photovoltaic element, such as a solar cell or an amorphous silicon material.

U.S. Pat. No. 4,472,627 relates to currency or other valuable documents containing a liquid crystal/ photovoltaic device which produces a coded display in response to artificial or ambient light. The device can function both as an anti-counterfeiting deterrent and also as a means for permitting a user to easily authenticate the validity of a document containing such a device.

U.S. Pat. No. 4,536,016 discloses a security token, such as a bank note or identity card, which comprised a sheet-like substrate made up from film of transparent biaxially oriented polymer coated with layers of opaque and heat activated adhesive material. The opaque layer is applied in such a way as to leave a transparent area for inspection of a security device, for example, a diffraction grating, incorporated in the polymer film. The substrate could bear printed or other identifying indicia and was protected with an intimately bonded layer of transparent polymeric material.

The substrate employed in U.S. Pat. No. 4,536,016 was based on the use of oriented polypropylene (OPP). After several commemorative bank note printings, while meeting many of the requirements for a bank note substrate, the plastic bank notes were found to fail in three major areas. First, the OPP substrate did not dead fold, causing problems in that the film retains either a flat or curved form, jamming cash registers and automatic handling equipment. Second, the OPP substrate has poor initiated tear resistance in the processing of currency, which quite frequently creates nicks on the edges of bills, resulting in catastrophic tears. Finally, the OPP product did not exhibit the tactility of paper currency, due to the fact that OPP does not emboss during the intaglio process.

Oriented high density polyethylene films have been employed in the area of plastic packaging. Such films, biaxially oriented to a degree of greater than 6.5 times in both the machine direction (MD) and the transverse direction (TD) are described in British Patent 1,287,527. U.S. Pat. No. 4,680,207 relates to imbalanced biaxially oriented films of linear low density polyethylene oriented up to six times in the machine direction, and up to three times in the transverse direction but less than in the machine direction.

While the aforementioned films have been shown to offer certain advantages over the prior art and generally meet the requirements for which they were designed, a need still exists for a film which provides the characteristics of a high quality, rag-type paper of the type typically employed in the production of bank notes and security products.

Therefore, it is an object of the present invention to provide a multilayer film having the characteristics of a high quality rag paper.

It is another object of the present invention to provide such a multilayer film which possesses the dead-fold characteristics of high quality papers while being easy to manufacture and reasonably durable.

It is a further object of the present invention to provide a multilayer film which possesses a high degree of tear resistance to both initiated and uninitiated tears and punctures in at least one direction.

It is yet another object of the present invention to provide a multilayer film which possesses the printability and embossability of a high quality paper.

It is still a further object of the present invention to provide a multilayer film which possesses a high degree of resistance to curling at higher temperatures, e.g., above 150° F.

Still another object of the invention is to provide a multilayer film which is suitable for banknote production from which it is difficult to abrade inks resulting in banknotes of long service life. Such films can achieve high levels of durability without overlaying the inked surface with protective coatings such as lacquers or polyurethanes.

Other objects and the several advantages of the present invention will become apparent to those skilled in the art upon a reading of the specification and the claims appended thereto.

SUMMARY OF THE INVENTION

In accordance with the present invention, there is provided a curl-resistant, cross-sectionally symmetrical, laminated multilayer film substrate for use in the production of banknotes, security papers and the like comprising:

(a) a first layer having inner and outer sides, comprising at least about 50 weight percent of a high density polyethylene having a density of at least about 0.94, said first layer being oriented in at least a first direction to a degree which is at least three times greater than the degree of orientation present in a second direction substantially normal to the first direction; and (b) a second layer having inner and outer sides, comprising at least about 50 weight percent of a high density polyethylene having a density of at least about 0.94, said second layer being oriented in at least a first direction to a degree which is at least three times greater than the degree of orientation present in a second direction substantially normal to the first direction;

(c) a laminating adhesive resin disposed between the inner sides of (a) and (b), which comprises a component selected from the group consisting of low density polyethylene (LDPE) and linear low density polyethylene (LLDPE); said second layer being laminated to said first layer so that the first direction of orientation of said second layer is substantially aligned with the first direction of orientation of said first layer.

In another embodiment, the present invention relates to a method for preparing a bank note which comprises:

i) laminating (a) a first layer having inner and outer sides, comprising at least about 50 weight percent of a high density polyethylene having a density of at least about 0.94, said first layer being oriented in the transverse direction (TD) to a degree which is at least three times greater than the degree of orientation present in the machine direction (MD) to (b) a second layer having inner and outer sides, comprising at least about 50 weight percent of a high density polyethylene having a density of at least about 0.94, said second layer being oriented in the transverse direction to a degree which is at least three times greater than the degree of orientation present in the machine direction, with a laminating adhesive resin which comprises a component selected from the group consisting of low density polyethylene (LDPE) and linear low density polyethylene (LLDPE), said second layer being laminated in the film substrate so that said transverse direction of orientation of said second layer is substantially aligned with said transverse direction of orientation of said first layer, thereby forming an embossable substrate; and ii) embossing said substrate.

The resultant films exhibit good dead-fold characteristics and other properties, including a symmetrical structure which provides curl free film even at elevated temperatures, e.g., 150° F., making them highly suited for the production of bank notes and other security documents.

In still another embodiment, the present invention relates to a security token such as a banknote or stock certificate prepared from an embossable, laminated multilayer film substrate, said substrate comprising:

(a) a first layer having inner and outer sides, comprising at least about 50 weight percent of a high density polyethylene having a density of at least about 0.94, said first layer being oriented in the transverse direction (TD) to a degree which is at least three times greater than the degree of orientation present in the machine direction (MD); and (b) a second layer having inner and outer sides, comprising at least about 50 weight percent of a high density polyethylene having a density of at least about 0.94, said second layer being oriented in the transverse direction to a degree which is at least three times greater than the degree of orientation present in the machine direction, said second layer being laminated to said first layer so that the transverse direction of orientation of said second layer is substantially aligned with the transverse direction of orientation of said first layer.

In still another embodiment, the present invention relates to a method for preparing an embossed, curl-resistant laminated multilayer film substrate for use in the production of banknotes, security papers and the like which comprises:

i) providing copolymer polypropylene skins on both sides of an oriented high density polyethylene layer having inner and outer sides and comprising at least about 50 weight percent of a high density polyethylene having a density of at least about 0.94, said layer being oriented in the transverse direction (TD) to a degree which is at least three times greater than the degree of orientation present in the machine direction (MD);

ii) coating said copolymer propylene skin provided on one side of said layer with an adhesion promoting primer thereby providing a first primed layer (a) having a primed surface;

iii) repeating steps i) and ii) to provide a second primed layer (b) having a primed surface;

iv) providing a discrete security device on said primed surface of one of said primed layers;

v) providing an orientable laminating adhesive resin between said primed layers and laminating said primed layers together while orienting said laminating adhesive resin to provide a substantially transparent laminate;

vi) gravure printing,g at least one side of said substantially transparent laminate with an opacifying ink in register with said security device thereby providing a clear window in register with said security device to render it visible from at least one side, preferably from either side, of said film substrate.

DETAILED DESCRIPTION OF THE INVENTION

In forming the multilayer film substrates for use in the production of the bank notes and other security documents of the present invention, at least two layers of the substrate are to contain a major proportion of a high density polyethylene (HDPE) having a density of at least about 0.94, preferably at least about 0.945. These film layers may be composed exclusively of a single HDPE resin, a mixture of HDPE resins, or of HDPE containing a minor proportion of another polymeric material, such as low density polyethylene (LDPE), linear low density polyethylene (LLDPE), polypropylene, ethylene vinyl alcohol (EVOH) copolymer, ethylene propylene (EP) copolymer or ethylene propylene butene-1 (EPB) copolymer, although a single HDPE resin or a blend of HDPE resins is particularly preferred in the practice of the present invention. The use of processing additives, such as microcrystalline wax or the like may be employed with the preferred HDPE resins to yield improved processing characteristics in the extruder by reducing extruder torque. Films made with either a blend of HDPE resins or with microcrystalline wax have been found to reduce the splittiness of the film which manifests itself as the tendency of the film to break in the TD direction.

When blends of HDPE polymers are employed, such blends can comprise two or more polymers all of which preferably have densities of 0.94 or greater. Blends of HDPE polymers advantageously comprise a major proportion of HDPE having a melt index of 0.6 to 1.2 and one or more polymers having a different melt index.

Terblends may also be desirable. Suitable terblends generally comprise 50 to 98 weight percent, preferably 84 to 96 weight percent of HDPE having a density of 0.96 or higher and a melt index of greater than 0.5 to about 2.0; 1 to 25 weight percent, preferably 3 to 8 weight percent of HDPE having a density of 0.94 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

As is particularly preferred, the film substrate of the present invention includes a) a first layer comprising at least about 50 weight percent of a high density polyethylene having a density of at least about 0.94, the first layer oriented in at least a first direction, e.g., transverse direction (TD), to a degree which is at least three times greater than the degree of orientation present in a direction substantially normal to the first direction, e.g., machine direction (MD), and b) a second layer also comprising at least about 50 weight percent of a high density polyethylene having a density of at least about 0.95, the second layer also oriented in at least a first direction, e.g., TD, to a degree which is at least three times greater than the degree of orientation present in a direction, e.g., MD, substantially normal to the first direction, the second layer being laminated to the film substrate so that the first direction of orientation of the second layer is substantially parallel to (or aligned with) the first direction of orientation of the first layer. A method of producing HDPE films with imbalanced biaxial orientation is disclosed in U.S. Pat. No. 4,870,122, the contents of which are incorporated by reference in their entirety.

As may be appreciated, to achieve the object of improved tear resistance in a multilayer film of the type describe herein, it has been discovered that imbalanced biaxially oriented HDPE films, laminated so that their primary directions of orientation are aligned substantially parallel to each other, can exhibit increased tear resistance where an orientable laminating resin, e.g., LLDPE, is disposed between the layers and subjected to orienting so that the primary direction of orientation in the oriented resin is substantially normal to the primary direction of orientation of the first and second HDPE film layers. In one embodiment, such orientation in the primary direction of orientation of the laminating adhesive resin is achieved during the laminating step itself, preferably in the machine direction (MD).

The degree of orientation of the HDPE film layers is an important aspect of this invention inasmuch as the proper degree of orientation provides desirable physical properties.

Although higher density HDPE resin having a density of 0.957 or greater can be made directly into thin films by cast extrusion, problems of curling, uniformity and flatness exist. Accordingly, thin HDPE films of about 0.8 to 1.5 mils having the best balance of properties are obtained using imbalanced biaxially oriented films prepared from films having a cast gauge of 12 to 20 mils which are reduced to the desired gauge by stretching, i.e., orientation.

The films are produced and oriented in a conventional manner. The film is heated to its orientation temperature and first subjected to MD orientation between two sets of nip rolls, the second rotating at a greater speed than the first in an amount equal to the desired draw ratio. Then the film is TD oriented by heating and subjecting it to transverse stretching in a tenter frame. Typically MD orientation is conducted at 60 to 120° C. and TD orientation at 110° to 145° C.

While it is preferred that the degree of orientation in a first film direction be at least three times greater than the degree of orientation present in a direction substantially normal to the first direction, it is more particularly preferred that each HDPE film layer be oriented to an extent of about 1.1 to about 2.0 times in the machine direction (MD) and about 6 to about 12 times in the transverse direction (TD). It has been found that the HDPE film layers can be produced with excellent quality at caster speeds of up to about 110 fpm corresponding to line speeds of 140 fpm at 1.25 times MD orientation.

When employed, this degree of imbalanced orientation produces an interesting effect in the HDPE components of the structure. The effect is a visible rippled and striated appearance, with the ripples being parallel to the transverse orientation direction. Under low magnification, in each square centimeter of HDPE film there will be seen from about 5 to about 30 discontinuous undulating ripples and striations generally parallel to the direction of orientation. This effect gives the film a slight translucent appearance, which tends to slightly blur distant objects viewed through the film. This effect indicates that the layers have been oriented in an imbalanced manner. The high density polyethylenes contemplated for use in the practice of the present invention include those disclosed in U.S. Pat. No. 4,870,122.

To achieve the desired surface characteristics required of the paper-like products of the present invention, one or more skin layers can be applied, in any known manner, to the multilayer HDPE substrate material, for example by coating or coextrusion before orientation or by coating the HDPE after one or both of the orientation operations. The skin layer can be any of the conventional materials used for this purpose in conjunction with polyolefin films, particularly polyethylene films. For example, to achieve a press-ready surface, a polymeric resin could be blended with fillers, fibers, pigments or the like, as necessary. Additionally, voided films, such as those disclosed in U.S. Pat. Nos. 4,377,616, 4,632,869, 4,758,462 and others, may be laminated to the multilayer HDPE substrate to impart the properties of those structures to the films of the present invention.

The HDPE-containing layers (a) and (b) as disclosed above can further comprise copolymer polypropylene skins, e.g., ethylene-propylene-butene-1 terpolymer, provided on at least one side thereof, preferably on both the inner and outer sides thereof. In a particular preferred embodiment, the skins themselves can also comprise a component which is similar to components in the adhesive resin used to laminate layers (a) and (b). For example, in a particularly preferred embodiment, low density polyethylene (LDPE) can make up from 10 to 20 wt % of the skins, with the balance being a copolymer polypropylene.

A suitable adhesion-promoting primer which provides greater adhesion between the laminated surfaces, e.g., polymers selected from the group consisting of polyethyleneimine, epoxy, polyurethane, and acrylic, can be provided between the copolymer polypropylene skins (on the inner sides of (a) and (b)) and the laminating adhesive resin. Primer compositions are disclosed in U.S. Pat. Nos. 4,447,494 and 4,681,803, which are incorporated herein by reference.

It is also envisioned that the substrate can be embossed, dyed, printed, texturised or otherwise treated before or after lamination; this being done on the internal or external surfaces of the laminated layers, so as to provide, for example, visual and/or tactile identification of the nature of a banknote, its significance or value.

The laminating techniques which can be employed to effect the present invention are known in the art and include: adhesive-bonding or cementing, e.g., with laminating adhesive resins, preferably with a transparent agent; solvent-bonding, where a mist of solvent is sprayed over the surfaces to be bonded together; thermal lamination by heat-bonding where thermoplastic sheets are subject to a hot rolling or pressing operation; cast-lamination where one layer is cast onto the second and the second forms a substrate; or, extrusion or draw-lamination as in calendering operations known in the art.

When discrete security devices are incorporated within the substrate, e.g., optically-variable devices (OVD's), they can be enclosed in pouches affixed to the substrate. On the other hand, the optically-variable devices themselves may be incorporated in one (or both) layers of the laminated substrate or between the layers, it not being necessary to incorporate a physically discrete device within a clearly defined pouch formed between the layers.

Any suitable security device can be employed in the present invention such as one selected from the group consisting of optically variable devices (OVDs), magnetic devices, electronic devices, and rare earth element-containing devices, with OVDs particularly preferred.

As employed in the present specification, the term "optically-variable" is used to denote any device which can readily be made to change appearance in a reversible, predictable and reproducible manner. The appearance of such devices may be altered, for example, by the application of body-heat or manual pressure, the variation of the angle of viewing and, the lighting conditions under which viewing takes place. The type of devices envisioned by the present invention are: diffraction gratings, liquid crystals, moire patterns and similar patterns produced by cross-gratings with or without superimposed, refractive, lenticular and transparent grids, such as Fresnel lenses, spaced partially-reflective and partially transparent, coatings yielding variable interference patterns or the like, bi-refringent or polarizing layers, zone-plates and the like.

Generally, optically-active devices of this nature are readily recognized by unskilled persons and are yet extremely difficult to reproduce by photographic and printing techniques. Moreover the production of any one such device in a reproducible fashion and the incorporation of such a device in a plastic laminate as described by the present invention is likely to be beyond the resources of the great majority of would-be forgers. Where a flexible paper-like product such as a bank-note is sought, it is of course preferable that the optically-variable devices should, themselves, be sheet-like, flexible and thin; it is also preferable for such devices to be compatible with the plastic material employed for the laminae to facilitate bonding and mitigate against reactive changes occurring with time.

According to the present invention, one preferred form of optically variable device may be a reflecting diffraction grating consisting of a metallized thermoplastic film embossed with a diffraction pattern. To prevent access to the embossed pattern for the purpose of illicit replication, it is preferable according to the present invention to employ a layer of thermoplastic material on each side of the metallized film which has similar solubility characteristics to that of the metal layer so that separation by preferential etching will be rendered extremely difficult. Another preferred device is a moire pattern formed by photographically reproducing fine line or dot patterns on each side of a thin film. The spacings of the dots and lines can be readily made too fine to be reproduced by printing techniques and yet the moire pattern can be displayed upon a much larger scale. Unique diffraction and moire patterns will often be preferred for use in bank notes and techniques are available for producing those by computer and photo-reduction methods.

In the production of low denomination bank notes, a suitable level of security against counterfeiting may be obtained by merely providing a clear "window" through the bank note. As indicated above, such a window would ensure that a scanner or color copier could not copy the note. Additionally, other security features can be incorporated into or onto the bank note, including reverse printing of the note to protect the security devices and the print.

It has been found that films similar to those of the present invention but which are "cross-oriented", can be susceptible to curling at temperatures above 150° F. Such cross-oriented films are similar to those of the present invention except that the second layer is laminated to the film substrate so that the first (primary) direction of orientation of the second layer is substantially normal to the first (primary) direction of orientation of the first layer. It is believed that such curling can result from differences in shrinkage at high temperatures in the machine direction and transverse direction of each layer. Additional curling susceptibility can result where coatings or skins of the layers have different coefficients of contraction from the HDPE component of the layers. Such imbalanced contraction and its attendant curling can be avoided by counterbalancing the overall shrinkage properties of one layer by laminating thereto a second layer identical to the first layer which is provided as a mirror image of the first layer. In other words, one half of the layered film structure is a mirror image of the other, with the plane of symmetry being along the horizontal midline of the layered film structure cross-section This provides a cross-sectionally symmetrical layered film structure. Examples of such films include those of ABA, ABBA, ABCCBA, ABCDCBA, etc. construction where each letter represents a film layer, skin, coating, or adhesive layer. Such a cross-sectionally symmetrical layered film structure is necessarily a "parallel-oriented" structure, i.e., the primary direction of orientation of the first layer is parallel to the primary direction of orientation of the second layer in order to meet the mirror image requirement. Such a construction provides a symmetrical structure wherein the opposing shrinkage forces counteract each other to a significant degree. However, such a two layer parallel construction can be susceptible to poor tear properties in one direction, e.g, TD where two TD oriented films are employed.

It has now been found that using a linear low density polyethylene (LLDPE) laminating resin oriented in the primary direction of orientation which is substantially perpendicular to the primary direction of orientation of the layers which it ties, evinces reduced susceptibility to tearing. The laminating resin can itself be subjected to orienting to some extent during lamination, preferably after the resin has at least partially or completely solidified, and preferably in the machine direction. Such orienting can be from 1.5 to 10 times, preferably from 4 to 6 times, corresponding to a total drawdown of the laminating adhesive resin of greater than 10%, preferably greater than 20%, say, 75%.

It has been found that as molecular weight of the laminating adhesive resin employed is increased, e.g., higher molecular weight LLDPE, orientation effects resulting from the lamination procedure are improved, resulting in a multilayer film of improved tear resistance in both machine direction and transverse direction while exhibiting curl resistance as well.

In one particularly preferred embodiment, the extrusion laminating adhesive resin is itself of ABA construction, i.e., the resin has a core of LLDPE (B layer) and outer or skin layers of LDPE (A layers). The ABA construction for the laminating resin provides an advantage inasmuch the A layers provide a high bond strength between the laminating adhesive resin and the oriented HDPE layers, while the higher molecular weight core (B layer) provides tear resistance in the transverse direction as a result of orienting in the machine direction during lamination. A laminating adhesive resin comprising LDPE only can result in a bond strength ranging from 300 to 800 grams/inch unprimed, and 600 to 1400 g/in with primed HDPE layers. Such bond strengths provide a product which is very difficult to delaminate and which therefore reduces the possibilities of tampering with any security device disposed between the HDPE layers. Use of the ABA laminating adhesive resin provides similar bond strengths while increasing transverse direction tear resistance (g/mil) by a factor of at least two.

The invention is further illustrated by the following non-limiting examples in which all parts are by weight unless otherwise specified. Example 3 is prophetic.

EXAMPLE 1

This example demonstrates the preparation of a multilayer film substrate produced in accordance with the present invention which is suitable for preparing banknotes having good dead fold characteristics.

A multilayer layer oriented film substrate having a 1.15 mil final thickness was prepared by coextruding HDPE with copolymer polypropylene skins on both sides to form a first layer (a). The HDPE resin employed was Oxychem M-6211, available from Occidental Chemical Corporation, Dallas, Tex., having a density of 0.96 and a melt index of 1.0. The copolymer polypropylene skins comprised 90% Chisso 7510, an ethylene-propylene-butene-1 terpolymer available from Chisso Corporation of Japan, and 10% Mobil LKA-753, a low density polyethylene available from Mobil Chemical Co., Norwalk, Conn. The HDPE comprised 90% of the resulting film layer (a) while the skins comprise 10% (5% on each side). A second film layer (b) identical to (a) was also formed. The first and second films (a) and (b) were then oriented 1.4 times in the MD at about 115° C. and 6 to 12 times, e.g., 10 times, in the TD direction at 115–140° C. in a tenter frame.

The copolymer skins on the inner side of oriented layers (a) and (b) were then coated with a polyethyleneimine (PEI) primer to form clear 1.15 mil OHD films.

On film (a) can be deposited optical varying devices (OVDs), at predetermined distances from one another so as to provide an OVD at the same location on each of the banknotes which are ultimately prepared from the film.

Films (a) and (b) were laminated by providing therebetween a laminating adhesive LDPE resin, Chevron 1017, available from Chevron Chemical Co., Houston, Tex. The laminating adhesive resin undergoes orienting in the machine direction during the laminating step itself, thereby imparting enhanced tear resistance in the transverse direction (TD). Lamination is carried out by conventional techniques, resulting in a multilayer film substrate having a final thickness of about 3.0 mils, the laminating adhesive resin itself providing about 0.7 mils thickness.

The resulting substrate was substantially clear and its physical properties are summarized in the Table below.

The substrate was then gravure printed on both sides using an opacifying ink. The gravure printing was carried out in such a way that the opacifying ink or coating was applied in register with the OVD embedded within the substrate, i.e., the coating was applied so as to avoid coverage of the OVD, thereby providing a clear window in register with said device, rendering the OVD visible from both sides of the printed substrate. The gravure printed substrate is 3.75 mils in thickness and can be taken up on a roll after printing or sheeted and guillotined in register to provide press-ready sheets of approximately 30 inches by 30 inches which are then packaged in units of 5000 sheets. The product exhibited good dead fold properties, tear resistance in both directions, printfastness, and provided better resolution while requiring less ink during printing than paper bank note substrates. Moreover the product was not susceptible to curling at high storage temperature (180° F. for 24 hours). The characteristics of the product thus permit its advantageous substitution for conventional paper substrates used in printing banknotes.

The product is also difficultly delaminatable, rendering isolation of an OVD for counterfeiting purposes extremely difficult, owing to the high bond strengths between the layers of films (a) and (b).

EXAMPLE 2

Example 1 was repeated except that the laminating adhesive resin employed was an LLDPE laminating grade adhesive resin, Dowlex 3010, available from Dow Chemical Co. of Midland, Mich. The characteristics for the resulting substrate are set out in the Table below. Use of the higher molecular weight LLDPE as the adhesive resin in Example 2 resulted in increased TD tear strength.

EXAMPLE 3

Example 1 is repeated except that the laminating adhesive resin employed is of ABA construction, A being LDPE, making up 20% of the total laminating resin (10% per side) and B being LLDPE, making up 80% of the total laminating resin. The characteristics for the resulting substrate are set out in the Table below. Use of the ABA laminating adhesive resin between layers (a) and (b) provides high bond strengths between the layers of films (a) and (b), which is believed attributable to the presence of LDPE components in both the laminating adhesive resin and the copolymer skins which are laminated to one another. Moreover, the presence of more readily orientable higher molecular weight LLDPE in the core of the laminating adhesive resin provides excellent TD tear strength resulting from orienting in the machine direction of the ABA laminating adhesive resin.

TABLE

|  |  | Ex. 1 | Ex. 2 | Ex. 3 |
|---|---|---|---|---|
| Tensile | MD | 6 | 6 | 6 |
| (psi × 10$^3$) | TD | 16 | 20 | 20 |
| Modulus | MD | 365 | 380 | 380 |
| Stiffness | MD | 17 | 20 | 20 |
| (grams) | TD | 21 | 24 | 24 |
| Tear Strength | MD | 89 | 63 | 80 |
| (g/mil) | TD | 4 | 5 | 20 |

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A method for preparing an embossed, curl-resistant laminated multilayer film substrate for use in the production of banknotes, security papers and the like which comprises:
   i) laminating
      (a) a first layer having inner and outer sides, comprising at least about 50 weight percent of a high density polyethylene having a density of at least about 0.94, said first layer being oriented in the transverse direction (TD) to a degree which is at least three times greater than the degree of orientation present in the machine direction (MD) to
      (b) a second layer comprising inner and outer sides, comprising at least about 50 weight percent of a high density polyethylene having a density of at least about 0.94, said second layer being oriented in the transverse direction to a degree which is at least three times greater than the degree of orientation present in the machine direction, with a laminating adhesive resin which comprises a component selected from the group consisting of low density polyethylene (LDPE) and linear low density polyethylene (LLDPE), said second layer being laminated in the film substrate so that said transverse direction of orientation of said second layer is substantially aligned with said transverse direction of orientation of said first layer, thereby forming an embossable substrate; and
   ii) embossing said substrate.

2. The method of claim 1 which further comprises providing copolymer polypropylene skins on at least one side of both (a) and (b).

3. The method of claim 2 which further comprises providing copolymer polypropylene skins on both the inner and outer sides of both (a) and (b).

4. The method of claim 1 wherein said laminating adhesive resin comprises an orientable linear low density polyethylene (LLDPE) which is oriented in the machine direction during said laminating, thereby improving tear resistance in the transverse direction of said embossable substrate.

5. The method of claim 4 wherein said laminating adhesive resin is of ABA construction, comprising a core layer B of orientable linear low density polyethylene (LLDPE) and layers A of low density polyethylene (LDPE) on either side of said core layer.

6. The method of claim 5 which further comprises providing a security device between (a) and (b), prior to said laminating.

7. The method of claim 6 wherein said embossing comprises gravure printing on both sides of said substrate in register, using an opacifying ink so as to provide clear windows on both sides of said substrate aligned with said security device thereby rendering it visible from at least one side.

8. The method of claim 5 which further comprises protecting said security device from tampering by providing an adhesion-promoting primer between the copolymer polypropylene skins on the inner sides of (a) and (b) and the laminating adhesive resin.

9. The method of claim 8 wherein said primer comprises polyethyleneimine (PEI).

* * * * *